United States Patent [19]

Ishikawa et al.

[11] Patent Number: 5,111,182
[45] Date of Patent: May 5, 1992

[54] VEHICLE BRAKING ACTION ALARMING APPARATUS

[75] Inventors: Kiyomitsu Ishikawa; Toru Tanabe, both of Tokyo, Japan

[73] Assignee: Stanley Electric Co., Ltd., Tokyo, Japan

[21] Appl. No.: 507,357

[22] Filed: Apr. 9, 1990

Related U.S. Application Data

[63] Continuation-in-part of Ser. No. 393,519, Aug. 14, 1989, abandoned, and Ser. No. 406,682, Sep. 13, 1989, abandoned, which is a continuation-in-part of Ser. No. 311,531, Feb. 15, 1989, abandoned.

[30] Foreign Application Priority Data

Feb. 19, 1988 [JP] Japan ............... 63-20682[U]

[51] Int. Cl.⁵ .............................. B60Q 1/44
[52] U.S. Cl. ........................... 340/479; 340/435; 340/902; 340/903
[58] Field of Search ........... 340/460, 479, 474, 435, 340/903, 901, 902, 464, 467, 468, 904, 942; 180/167; 307/10.8

[56] References Cited

U.S. PATENT DOCUMENTS 3,192,437  6/1965  Meyer .
3,340,763  9/1967  Power .
3,514,610  5/1970  Huston et al. .
3,846,749  11/1974  Curry .
3,892,483  7/1975  Säufferer .
3,949,362  4/1976  Doyle et al. .
4,581,769  4/1986  Grimsley et al. .............. 340/902
4,651,129  3/1987  Wood et al. .
4,663,609  5/1987  Rosario .

Primary Examiner—Jin F. Ng
Assistant Examiner—Brent A. Swarthout
Attorney, Agent, or Firm—Frishauf, Holtz, Goodman & Woodward

[57] ABSTRACT

A vehicle braking action alarming apparatus includes: a general stop-lamp or high-mount stop-lamp having a light emitting element which includes a light emitting diode; an oscillator for generating a signal at a predetermined frequency; a driver for driving and illuminating the stop-lamp; a controller for applying an output from the oscillator to the driver when a brake switch of the vehicle is turned on; a photosensor mounted at the front of the vehicle for receiving light from the stop-lamp of another preceding vehicle; and a processor/driver unit for processing a signal from the photosensor which received the light from the preceding vehicle, and for driving a sound source for generating an audible alarm sound warning of a braking action in the preceding vehicle. The oscillator is timed so as to operate only during a brief initial period following the actuation of the brake switch, which period can be moderately prolonged for the audible alarm in the receiving processor/driver.

22 Claims, 2 Drawing Sheets

५,111,182

VEHICLE BRAKING ACTION ALARMING APPARATUS

CROSS-REFERENCE TO RELATED APPLICATIONS

This application is a Continuation-In-Part of the following applications, all of which are of the same applicants and assigned to the same assignee:
Ser. No. 07/393,519, filed Aug. 14, 1989, now abandoned; and
Ser. No. 07/406,682, filed Sept. 13, 1989, now abandoned, which was a Continuation-In-Part of application Ser. No. 07/311,531, filed Feb. 15, 1989, now abandoned.

BACKGROUND OF THE INVENTION

1. Field of the Invention

The present invention relates to a vehicle braking action alarming apparatus mounted on a vehicle, such as an automobile, for ensuring driving safety by producing both visual and audio alarms for warning an operator of a succeeding vehicle of a braking action by a preceding vehicle.

2. Description of the Prior Art

Various means have been developed to ensure driving safety of automobiles. One such means is a display device mounted on a vehicle, such as a high-mount stop-lamp (generally mounted on a rear window of an automobile), which is used together with a conventional stop-lamp.

Upon braking action by a preceding vehicle, the conventional stop-lamp and high-mount stop-lamp are illuminated to thus inform a succeeding vehicle of the braking action. The high-mount stop-lamp is mounted at a height easy to be visually recognized by the operator of a succeeding vehicle. However, since the high-mount stop-lamp produces only emitted light, a driver of a succeeding vehicle may sometimes miss it inadvertently, leaving a possibility of accident.

SUMMARY OF THE INVENTION

It is therefore an object of the present invention to provide a vehicle braking action alarming apparatus which can reliably inform a driver of a succeeding vehicle of a braking action in a preceding vehicle, without fail.

The above object is achieved by the vehicle braking action alarming apparatus according to the present invention, which comprises: a stop-lamp means such as a conventional stop-lamp or high-mount stop-lamp mounted at the rear of a vehicle, said stop-lamp means having light emitting means which includes a light emitting diode; oscillator means for generating a signal at a predetermined frequency; lamp driver means for driving and illuminating said stop-lamp means; controller means for applying an output from said oscillator means to said driver means when a brake switch of said vehicle is turned on; photosensor means mounted at the front of said vehicle for receiving light from said stop-lamp means of another preceding vehicle; and processor/driver means for processing a signal from said photosensor which receives said light from said preceding vehicle and for driving a sound source for generating an alarm sound warning of a braking action of said preceding vehicle.

DETAILED DESCRIPTION

Figure 1:
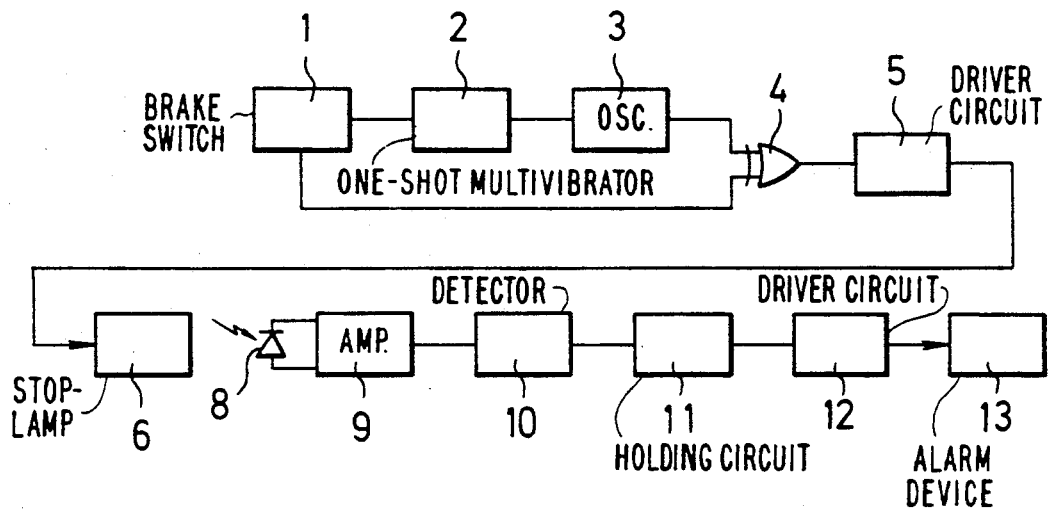
FIG. 1 is a block diagram showing a first embodiment of the vehicle braking action alarming apparatus according to the resent invention.
Figure 2:
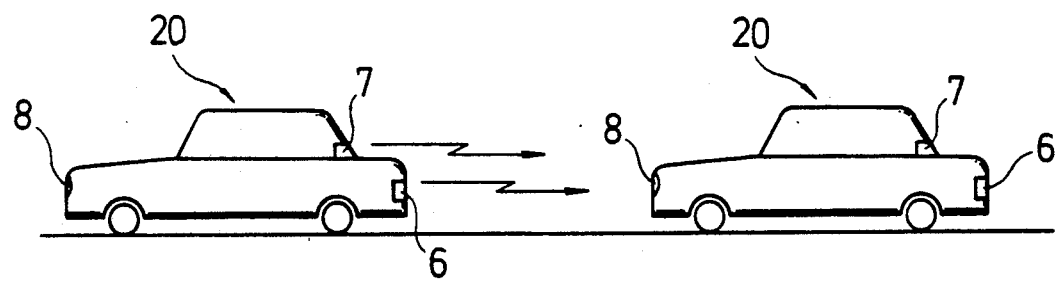
FIG. 2 is a schematic side view showing the installation positions of stop-lamps, photosensors and the like according to the present invention.

FIGS. 1 and 2 show the first embodiment of the vehicle braking action alarming apparatus according to the present invention. The light emitting element of a general stop-lamp or high-mount stop-lamp used in this embodiment comprises a light emitting diode (LED). Referring to FIG. 1, block 1 represents a brake switch. Upon turning on the brake switch 1, a one-shot multivibrator 2 is activated to generate a pulse having a width of several tens of microseconds. An oscillator 3 generates pulse signals of several hundreds of kHz for several tens of microseconds while the pulse is applied thereto from the one-shot multivibrator 2. An Exclusive-OR gate 4 is supplied with an output from the oscillator 3 and a signal from the brake switch 1, to thereby subject them to an exclusive-OR operation. An output from the Exclusive-OR gate 4 is supplied to a driver circuit 5. Reference number 6 represents the general stop-lamp which is mounted, as shown in FIG. 2, at the rear of an automobile 20. Instead of the general stop-lamp 6, a high-mount lamp 7 (generally mounted on a rear window of automobile 20) may be driven by the driver circuit 5.

A photosensor 8 such as a photodiode mounted at the front of the automobile 20 receives light from the general stop-lamp 6 or from the high-mount stop lamp 7. A tuned amplifier 9 amplifies predetermined components of a signal from the photosensor 8. The output from the tuned amplifier 9 is detected and converted into a d.c. voltage in a detector circuit 10. The output from the detector circuit 10 is held for several hundreds of milliseconds to several seconds by a holding circuit 11. This held signal is supplied to a driver circuit 12 which in turn drives an alarm device 13 such as a buzzer for the generation of sounds.

Figure 3:
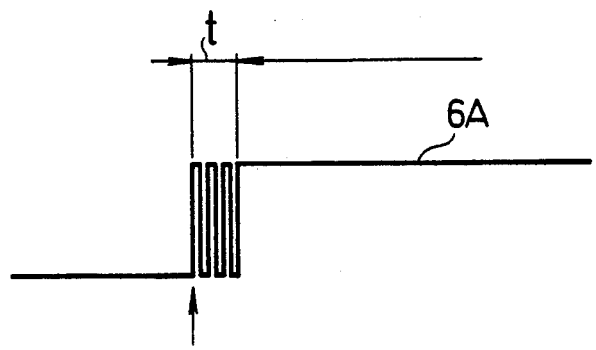
FIG. 3 shows a signal waveform for illustrating the operation of the first embodiment.

The operation of the vehicle braking action alarming apparatus of the first embodiment constructed as above will now be described. Upon depression of the brake pedal (not shown) of the automobile, the brake switch 1 turns on to activate the oneshot multivibrator 2. The oscillator 3 then generates pulse signals of several hundreds of kHz which are supplied via the Exclusive-OR gate 4 to the driver circuit 5. The pulse signals of several hundreds of kHz are generated for a time "t" of several tens of microseconds once or several times depending upon the number of actuations of the brake switch 1, as indicated by the waveform 6A shown in FIG. 3. The signal with this waveform is applied to the driver circuit 5 to illuminate the general stop-lamp 6 or high-mount stop-lamp 7, thereby visually notifying a following or succeeding vehicle of a braking action.

A succeeding vehicle, if any, detects light from the stop-lamp 6 or 7 by means of the photosensor 8 mounted at the front of the succeeding vehicle. The predetermined components of the signal from the photosensor 8 are amplified by the tuned amplifier 9, and are detected and converted into a d.c. voltage which is held by the holding circuit 11 for a short time duration. During this short time duration, the buzzer 13 is driven by the driver circuit 12 and generates audible alarm sounds.

The driver of the succeeding vehicle is thus informed of the braking action by the preceding vehicle with the aid of both lamp illumination and buzzer sounds, so that the driver can take proper driving actions against the braking action of the succeeding vehicle for improving driving safety.

Figure 4:
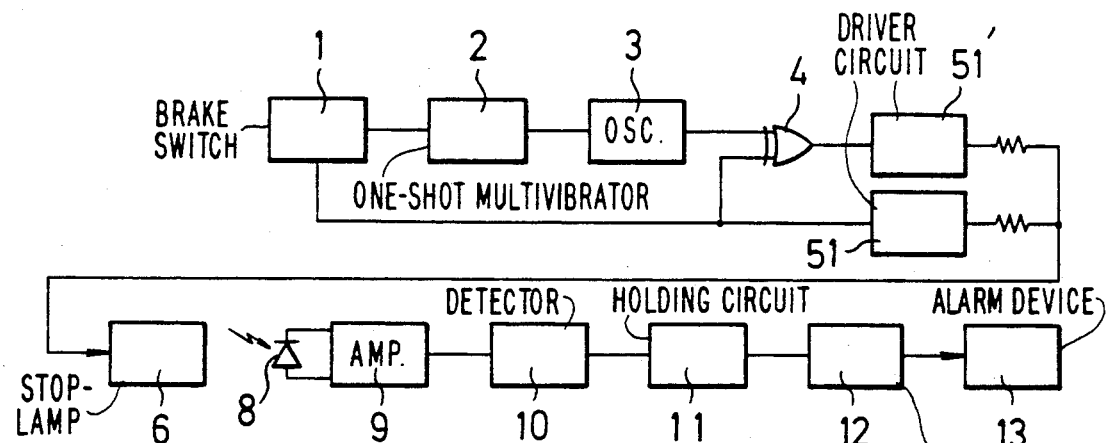
FIG. 4 is a block diagram showing a second embodiment of the vehicle braking action alarming apparatus according to the present invention.
Figure 5:
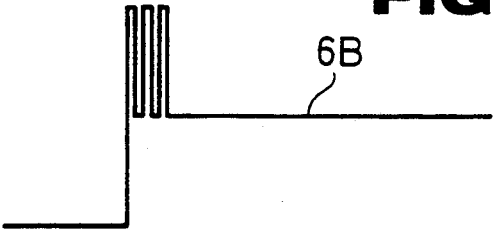
FIG. 5 shows a signal waveform for illustrating the vehicle braking action of the second embodiment.

FIG. 4 is a block diagram showing the second embodiment of the vehicle brake action alarming apparatus according to the present invention. The same reference numerals as previously used are used for like elements. In the first embodiment, only the output from the oscillator 3 is applied via the Exclusive-gate 4 to the driver circuit 5 and hence to the stop-lamp 6 when the brake switch 1 turns on. However, in the second embodiment, the output from the brake switch 1 and the output from the oscillator 3 are added together and supplied to the stop-lamp 6. To this end, there are provided two driver circuits 51 and 51'. The output from the brake switch 1 is directly applied to the driver circuit 51. The output from the Exclusive-OR gate 4, to which both the outputs from the brake switch 1 and oscillator 3 are supplied, is applied to the driver circuit 51'. The outputs from the driver circuits 51 and 51', which are connected in parallel to the general stop-lamp 6 or high-mount stop-lamp 7, are supplied to the stop-lamp 6 or 7. Therefore, the signal supplied to the stop-lamp 6 or 7 is the sum of the outputs from the brake switch 1 and oscillator 3, and has a waveform 6B as shown in FIG. 5.

Figure 6:
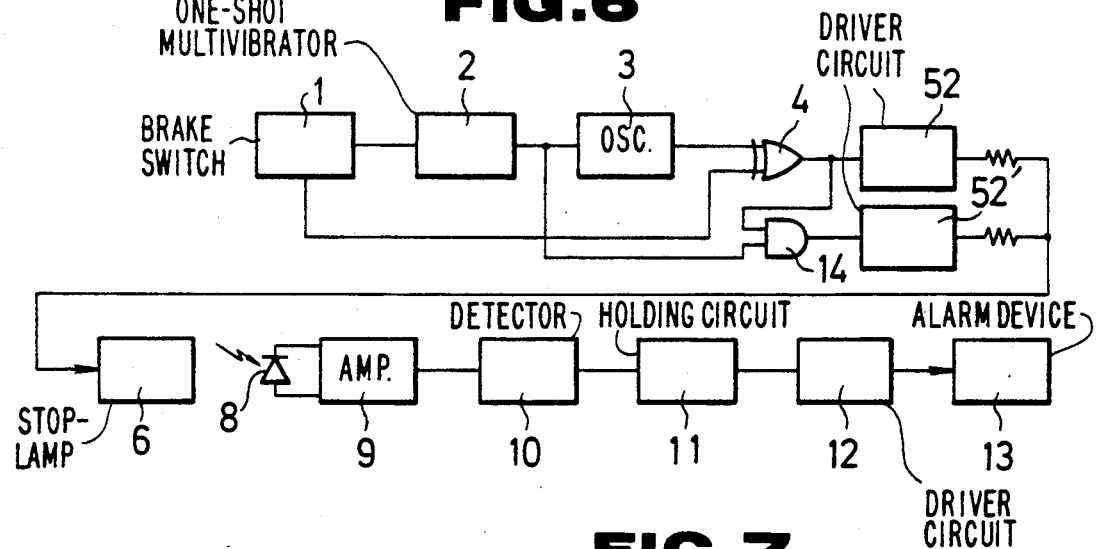
FIG. 6 is a block diagram showing a third embodiment of the vehicle braking action alarming apparatus according to the present invention.
Figure 7:
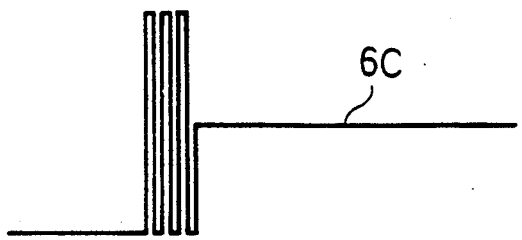
FIG. 7 shows a signal waveform for illustrating the operation of the third embodiment.

FIG. 6 is a block diagram showing the third embodiment of the vehicle braking action alarming apparatus according to the present invention. The same reference numerals as previously used are used for like elements. In this embodiment, a driver circuit 52 is supplied with an output from the Exclusive-OR gate 4 to which the outputs from the brake switch 1 and oscillator 3 are supplied, whereas another driver 52' is supplied with an output from an AND gate 14 to which the output from the Exclusive-OR gate 4 and the output from the one-shot multivibrator 2 are supplied. The driver circuits 52 and 52' are connected in parallel to the stop-lamp 6 or 7 in a similar manner as in the second embodiment. The signal applied to the stop-lamp 6 or 7, therefore has a waveform 6C as shown in FIG. 7, the portion of the signal having the pulses having twice the amplitude as the corresponding signal portions in the first and second embodiments.

In the second and third embodiments, since the light pulse signals have a large peak value, the light can propagate a further distance than in he first embodiment. The other advantages of the second and third embodiments are the same as the first embodiment.

As described above, according to the present invention, a stop-lamp informing of a braking action is supplied also with pulse signals upon braking action, and the pulsed light received by the succeeding vehicle is processed to generate an alarm sound. Therefore, a braking action by a preceding vehicle can be informed to the succeeding vehicle with the aid of both lamp illumination and alarm sounds, to thereby ensure better driving safety. Since an LED rear combination lamp or LED high-mount stop lamp are already originally mounted on a vehicle to provide visual illumination to indicate a braking action, no additional light emitting elements are required Further, the pulse signals are sent to the lamp only for several tens of microseconds so that the lamp illumination for visually alarming of a braking action is not adversely affected.

While it is apparent that many modifications and variations may be implemented without departing from the scope of this invention, it is intended by the appended claims to cover all such modifications and variations which fall within the true spirit and scope of the invention.

For example, it would also be satisfactory if the time period of the one-shot multivibrator is several tens to several hundreds of milliseconds, and the frequency of the oscillator should be sufficiently high so that many cycles of the oscillator output signal will be generated during the time period of the one-shot multivibrator 2.

In general the oscillator frequency should be sufficiently high that a flashing condition of the light emitted by the light emitting diode or diodes is not visually observable by an operator of a following vehicle but the light emitted by the diode is nevertheless visually observable.

We claim:

1. A vehicle braking action alarming apparatus comprising:
   stop-lamp means, mounted at the rear of the vehicle, for emitting light, said stop-lamp means having light emitting means which includes a light emitting diode;
   oscillator means for generating a signal at a predetermined frequency;
   driver means for driving and illuminating said stop-lamp means;
   controller means for applying an output from aid oscillator means to said driver means when a brake switch of said vehicle is turned on, for causing said driver means to drive and illuminate said stop-lamp means to produce a light emission from said stop lamp means at said predetermined frequency;
   photosensor means mounted at the front of said vehicle for receiving light from said stop-lamp means of another preceding vehicle; and
   processor/driver means for processing a signal from said photosensor which received said light from said stop-lamp means of said another preceding vehicle, detecting said signal at said predetermined frequency and for driving a sound source for generating an audible alarm sound, warning an operator of a braking action of said another preceding vehicle when a light emission of said predetermined frequency is received and detected.

2. The vehicle braking action alarming apparatus of claim 1, wherein said output signal from said oscillator means has a frequency of about several hundreds KHz 3. The vehicle braking action alarming apparatus of claim 2, wherein said controller means includes means for timing the supply of said output signal of said oscillator means to said driver means for a predetermined period of time beginning when said brake switch is turned on.

4. The vehicle braking action alarming apparatus of claim 3, wherein said controller means comprises a one-shot multivibrator means for generating a pulse having a pulse width corresponding to said predetermined period of time.

5. The vehicle braking action alarming apparatus of claim 4, wherein said predetermined period of time is about ten to several tens of microseconds.

6. The vehicle braking action alarming apparatus of claim 1, wherein said controller means supplies said output signal of said oscillator means to said driver means for a predetermined period of time.

7. The vehicle braking action alarming apparatus of claim 6, wherein said controller means comprises a one-shot multivibrator means for generating a pulse having a pulse width corresponding to said predetermined period of time 8. The vehicle braking action alarming apparatus of claim 7, wherein said predetermined period of time is about ten to several tens of microseconds.

9. The vehicle braking action alarming apparatus of claim 1, wherein said output signal from said oscillator means has a frequency sufficiently high that a flashing condition of said light emitted by said light emitting diode is not visually observable by an operator of a following vehicle but the light emitted by said light emitting diode is nevertheless visually observable.

10. The vehicle braking action alarming apparatus of claim 9, wherein said controller means supplies said output signal from said oscillator means to said driver means for a given period of time which is sufficiently small that flashing of the emitted light is not visually observable by an operator of a following vehicle.

11. The vehicle braking action alarming apparatus of claim 1, wherein said controller means supplies said output signal from said oscillator means to said driver means for a given period of time which is sufficiently small that flashing of the emitted light is not visually observable by an operator of a following vehicle.

12. The vehicle braking action alarming apparatus of claim 1, wherein alarm means are provided comprising said sound source for generating an alarm sound.

13. The vehicle braking action alarming apparatus of claim 1, wherein said processor/driver means includes a holding circuit for extending the time interval over which said sound source is driven for at least a few tenths of a second.

14. The vehicle braking action alarming apparatus of claim 3, wherein said controller means for applying an output from said oscillator means to said driver means includes an exclusive OR gate means having one input connected to said output of said oscillator means, a second input connected to said brake switch and an output connected to said driver means, whereby a rapid intermittent excitation of said stop-lamp means is produced for said predetermined period at substantially the same voltage at said stop lamp means as when said brake switch remains turned on after cessation of said intermittent excitation.

15. The vehicle braking action alarming apparatus of claim 3, wherein said driver means for driving and illuminating said stop lamp means comprises first and second driver circuits, each having an input and an output, and wherein said controller means for applying an output from said oscillator means to said driver means when the brake switch of said vehicle is turned on includes exclusive OR gate means having a first input connected to said output of said oscillator means, a second input connected to said brake switch and an output connected to an input of said first driver circuit, and said second driver circuit has an input connected to said brake switch, said outputs of said first and second driver circuits being connected to said stop-lamp means so as to provide an additive combination of the outputs of said first and second driver circuits for illuminating said stop-lamp means.

16. The vehicle braking action alarming apparatus of claim 3, Wherein said driver means for driving and illuminating said stop-lamp means comprises first and second driver circuits, each having an input and an output, and wherein said means for timing the supply of said output signal of said oscillator means to said driver means has a first output connection connected to said oscillator means for timing the operation thereof and also a second output, and wherein an exclusive OR gate means is provided having a first input connected to said output of said oscillator means, a second input connected to said brake switch and an output connected to said input of said first driver means, and an AND gate means is provided having a first input connected to the output of said exclusive OR gate means and a second input connected to said second output connection of said means for timing the supply of said output signal of said oscillator means and an output connected to said input of said second driver circuit, said outputs of said first and second driver circuits being connected to an input of said driver means such that their outputs are additively supplied to said driver means, whereby oscillations produced by said oscillator means are reproduced during said predetermined period at a peak voltage that is twice the voltage of illumination of said stop-lamp means after said oscillations have ceased.

17. A brake action alarming method initiated in a first motor vehicle having a brake switch, and at least one of a conventionally mounted stop lamp and high-mount stop lamp whose light emitting elements respectively include light emitting diodes, comprising:
  generating a signal having a predetermined frequency higher than the flicker perception threshold of the human eye;
  supplying said signal having said predetermined frequency to lamp driver circuit means upon turning on of the brake switch to produce an intermittent light emission by said light emitting diodes of said lamp at said predetermined frequency for a predetermined initial period following the actuation of said brake switch;
  receiving light emitted from said light emitting diode at a second motor vehicle following said first motor vehicle;
  detecting in said received light the light intermittently emitted at said predetermined frequency;
  driving an alarm means at said following second motor vehicle responsive to detection of said light intermittently emitted at said predetermined frequency to provide an audible alarm to an operator of said following second motor vehicle to alert said operator of a braking action in said first mentioned motor vehicle.

18. The brake action alarming method of claim 17, wherein said intermittently emitted light is emitted at a sufficiently high frequency and for a sufficiently short period of time for the intermittent nature of its emission to be unobservable by an operator of said following motor vehicle.

19. The brake action alarming method of claim 17, wherein said intermittent emission of said light is at a rate of about several hundreds of KHz and is produced for about several tens of microseconds.

20. The brake action alarming method of claim 17, wherein the supplying of said signal having said predetermined frequency to said lamp driver circuit means upon turning on of said brake switch is performed in such a way that said intermittent light emission by said light emitting diodes for said predetermined initial period has peak values of substantially the value of light emission of said diodes in response to the turned on position of said brake switch following the end of said predetermined initial period.

21. The brake action alarming method of claim 17, wherein the supplying of said signal having said predetermined frequency to said lamp driver circuit means upon turning on of said brake switch is performed in such a way that said signal of said predetermined frequency is supplied to said lamp driver circuit means additively with a signal produced by a turned on condition of the brake switch 22. The brake action alarming method of claim 17, wherein the supplying of said signal having said predetermined frequency to said lamp driver circuit means upon turning on of said brake switch is performed in such a way that said signal having said predetermined frequency is supplied to said lamp driver circuit means for said predetermined initial period at a voltage of about twice the value of a steady voltage thereafter supplied in response to a continued turned on condition of said brake switch.

* * * * *